US010986384B2

(12) United States Patent
Srinivasan et al.

(10) Patent No.: US 10,986,384 B2
(45) Date of Patent: Apr. 20, 2021

(54) MODIFYING VIDEO DATA CAPTURED BY A CLIENT DEVICE BASED ON A REQUEST RECEIVED BY A DIFFERENT CLIENT DEVICE RECEIVING THE CAPTURED VIDEO DATA

(71) Applicant: Facebook, Inc., Menlo Park, CA (US)

(72) Inventors: Ragavan Srinivasan, Cupertino, CA (US); Bryce David Redd, Fremont, CA (US); John Samuel Barnett, Newark, CA (US); Tommer Leyvand, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/854,639

(22) Filed: Dec. 26, 2017

(65) Prior Publication Data

US 2018/0302659 A1 Oct. 18, 2018

Related U.S. Application Data

(60) Provisional application No. 62/485,476, filed on Apr. 14, 2017.

(51) Int. Cl.
*H04N 7/10* (2006.01)
*H04N 21/2343* (2011.01)
(Continued)

(52) U.S. Cl.
CPC ..... *H04N 21/23439* (2013.01); *G11B 27/031* (2013.01); *G11B 27/11* (2013.01); *H04N 21/2743* (2013.01); *H04N 21/4223* (2013.01); *H04N 21/44008* (2013.01); *H04N 21/44029* (2013.01); *H04N 21/8549* (2013.01);
(Continued)

(58) Field of Classification Search
CPC ............. H04N 21/812; H04N 21/4532; H04N 21/44222; H04N 21/25891; H04N 21/23439; H04N 21/8549; H04N 21/2743; H04N 21/4223; H04N 21/44029; H04N 21/44008; H04N 21/2668; H04N 21/25883; H04N 21/4788; H04N 21/252; G11B 27/11; G11B 27/031
See application file for complete search history.

(56) References Cited

U.S. PATENT DOCUMENTS 5,666,487 A * 9/1997 Goodman ........... H04L 49/3081
348/E5.002
9,501,915 B1 * 11/2016 Cheyer ................. G06F 3/0482
(Continued)

*Primary Examiner* — Annan Q Shang
(74) *Attorney, Agent, or Firm* — Fenwick & West LLP

(57) ABSTRACT

A video application executing on a client device allows a user to modify video data captured by the client device. The video application allows the user to transmit the video data to a viewing client device for presentation to a viewing user. For example, the video application transmits the video data to an online system, which transmits the video data to the viewing client device. The viewing user provides a request to modify the video data to the viewing client device, which transmits the request to the online system. Based on the request from the viewing client device, the online system identifies a modification to the video data to the client device, which modifies the captured video data accordingly. The modified video data is provided from the client device to the viewing client device via the online system.

14 Claims, 3 Drawing Sheets

(51) Int. Cl.

| | | |
|---|---|---|
| *G11B 27/031* | (2006.01) | |
| *H04N 21/2743* | (2011.01) | |
| *H04N 21/4223* | (2011.01) | |
| *H04N 21/4402* | (2011.01) | |
| *H04N 21/44* | (2011.01) | |
| *H04N 21/8549* | (2011.01) | |
| *G11B 27/11* | (2006.01) | |
| *H04N 21/2668* | (2011.01) | |
| *H04N 21/258* | (2011.01) | |
| *H04N 21/4788* | (2011.01) | |
| *H04N 21/442* | (2011.01) | |
| *H04N 21/25* | (2011.01) | |

(52) U.S. Cl.
CPC ..... *H04N 21/252* (2013.01); *H04N 21/25883* (2013.01); *H04N 21/25891* (2013.01); *H04N 21/2668* (2013.01); *H04N 21/44222* (2013.01); *H04N 21/4788* (2013.01)

(56) References Cited

U.S. PATENT DOCUMENTS

| | | | |
|---|---|---|---|
| 9,998,796 B1* | 6/2018 | Kedenburg, III | H04N 21/4788 |
| 10,498,794 B1* | 12/2019 | Keighran | H04L 65/607 |
| 2008/0018079 A1* | 1/2008 | Mori | B60R 21/33 280/728.1 |
| 2009/0328122 A1* | 12/2009 | Amento | H04N 21/44012 725/114 |
| 2011/0126252 A1* | 5/2011 | Roberts | H04N 7/17318 725/114 |
| 2012/0117472 A1* | 5/2012 | Su | H04N 21/2358 715/719 |
| 2012/0144445 A1* | 6/2012 | Bonta | H04L 12/1868 725/116 |
| 2012/0215542 A1* | 8/2012 | Schroeter | H04M 1/72522 704/270.1 |
| 2012/0265621 A1* | 10/2012 | Sechrist | H04N 21/8173 705/14.73 |
| 2012/0265892 A1* | 10/2012 | Ma | H04N 21/23418 709/231 |
| 2012/0296972 A1* | 11/2012 | Backer | H04L 29/06476 709/204 |
| 2013/0066749 A1* | 3/2013 | Cooke | G06F 3/017 705/27.2 |
| 2013/0290557 A1* | 10/2013 | Baratz | H04N 21/8456 709/231 |
| 2013/0342629 A1* | 12/2013 | North | H04N 21/8146 348/14.01 |
| 2014/0215542 A1* | 7/2014 | Terpe | H04N 21/4126 725/112 |
| 2015/0009184 A1* | 1/2015 | Baker | H04N 5/2621 345/175 |
| 2015/0062284 A1* | 3/2015 | Rangan | H04N 7/15 348/14.08 |
| 2015/0262402 A1* | 9/2015 | Heinz, II | H04N 21/6582 345/420 |
| 2015/0264416 A1* | 9/2015 | Heinz, II | H04N 21/44012 725/34 |
| 2015/0264425 A1* | 9/2015 | Heinz, II | H04N 21/47205 386/223 |
| 2016/0286244 A1* | 9/2016 | Chang | H04N 21/21805 |
| 2016/0360267 A1* | 12/2016 | Marilly | G06F 3/013 |
| 2016/0375296 A1* | 12/2016 | Downey | A63B 21/4037 52/506.01 |
| 2017/0214945 A1* | 7/2017 | Chang | H04H 20/71 |
| 2018/0139472 A1* | 5/2018 | Shaw | H04N 21/2402 |

* cited by examiner

MODIFYING VIDEO DATA CAPTURED BY A CLIENT DEVICE BASED ON A REQUEST RECEIVED BY A DIFFERENT CLIENT DEVICE RECEIVING THE CAPTURED VIDEO DATA

CROSS-REFERENCE TO RELATED APPLICATIONS

This application claims the benefit of U.S. Provisional Application No. 62/485,476, filed Apr. 14, 2017, which is incorporated by reference in its entirety.

BACKGROUND

This disclosure relates generally to obtaining video data by a client device, and more specifically to an augmenting video data obtained by the client device with additional content when a viewing client device renders the video data.

Users of client devices increasingly capture video data via image capture devices included in various client devices and share the captured video with other users. For example, through an application associated with an online system executing on a client device, a user of the client device distributes video data captured via the client device, or otherwise obtained via the client device, to other users of the online system. To encourage user engagement, many applications allow a user of the client device to modify video data obtained by the client device and subsequently present the modified video data.

For example, various applications allow users to apply filters to video data obtained by a client device or to overlay text or images onto portions of video data obtained by the client device. However, conventional applications for modifying video data receive modifications to the video data from a user of the client device from which the video was obtained. This limits modification of the obtained video data to a particular user, namely the user of the client device capturing the video. If the obtained video data is presented to other users, the other users are unable to modify the video data, and are limited to viewing modifications of the video data initiated by the user who captured the video data.

SUMMARY

A client device, such as a smartphone or a tablet computer, includes an image capture device configured to capture video data. An application executing on the client device receives the captured video data and provides the captured video data to an online system, which provides the captured video data to one or more other client devices associated with other users of the online system. Additionally, the application executing on the client device augments or modifies the captured video data based on requests the client device receives from the user. For example, the application overlays additional images or text on the captured video data based on requests received from the user. The application may augment or otherwise modify the video data when the video data is captured, or may modify the video data at a time subsequent to a time when the video data was captured.

Additionally, the online system allows other users to whom the captured video data is modified to augment or modify the captured video data based on requests received from other client devices associated with the other users. For example, the online system provides video data captured by the client device to a viewing client device associated with a viewing user via an application executing on the viewing client device. When the application executing on the viewing client device receives a request from the viewing user to modify the video data, the viewing client device communicates the request to the online system. Based on the request from the viewing client device, the online system modifies the video data and provides the modified video data to the viewing client device. In some embodiments, the online system determines a modification corresponding to the received request, performs the determined modification to the video data received from the client device, and provides the modified video data to the viewing client device. In various embodiments, the online system provides the modified video data to other client devices associated with other users receiving the video data captured by the client device. Alternatively, the online system communicates the request received from the viewing client device to the client device, where the application executing on the client device performs the modification corresponding to the request received from the viewing client device. The application executing on the client device provides the modified video data to the online system, which provides the modified video data to the viewing client device, and may provide the modified video data to other client devices.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
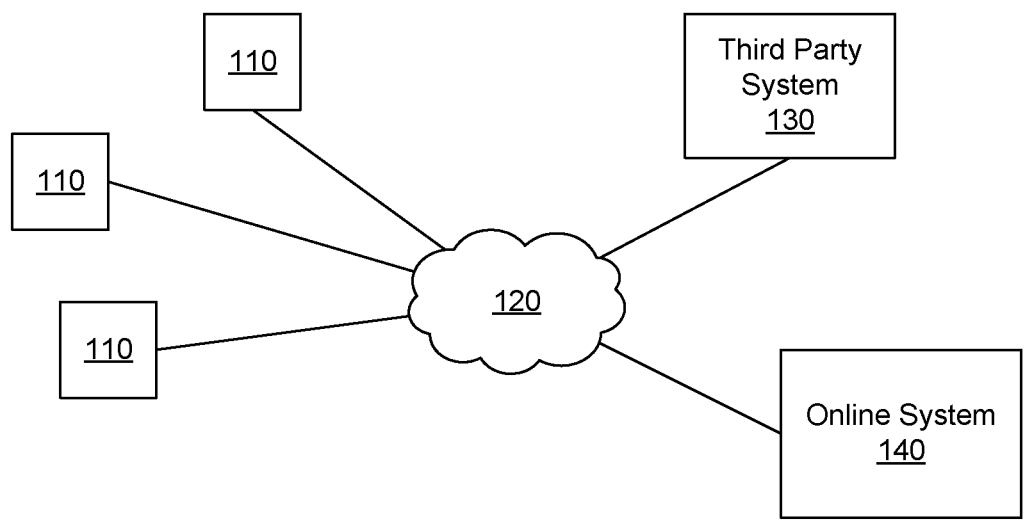
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, a messaging server, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

As further described below in conjunction with FIG. 3, in various embodiments a client device 110 includes an image capture device capable of capturing video data and an application for modifying the captured video data. For example, an application executing on the client device 110 allows a user of the client device 110 to overlay images or text onto portions of video data captured by an image capture device or otherwise obtained by the client device 110. In some embodiments, the application for modifying the video data provides additional functionality. For example, the application also allows a user to exchange content (e.g., messages) with other users of the online system 140; as an example, the application provides video data captured by the client device 110 to the online system 140, which provides the captured video data to other client devices 110 for presentation to other users. Alternatively, an additional application allows the user to communicate with users of the online system 140 and the additional application obtains video data from the application that captured the video data. In various embodiments, the application modifies the captured video data and provides the modified video data to the additional application. Alternatively, the application modifies the captured video data and communicates the modified video data to the online system 140 for distribution to other client devices 110.

To modify obtained video data while conserving resources (e.g., power supply resources), the application extracts information from the video data when the video data is obtained and stores metadata describing the extracted information in association with the video data. After receiving information describing one or more modifications to the video data, the application (or another application) uses the metadata associated with the video data to perform the described one or more modifications. This allows the video data to be modified without extracting information from the video data when the video data is received and again when the video data is modified. An example client device 110 is further described below in conjunction with FIG. 3.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Various third party systems 130 provide content to users of the online system 140. For example, a third party system 130 maintains pages of content that users of the online system 140 may access through one or more applications executing on a client device 110. The third party system 130 may provide content items to the online system 140 identifying content provided by the online system 130 to notify users of the online system 140 of the content provided by the third party system 130. For example, a content item provided by the third party system 130 to the online system 140 identifies a page of content provided by the online system 140 that specifies a network address for obtaining the page of content.

Figure 2:
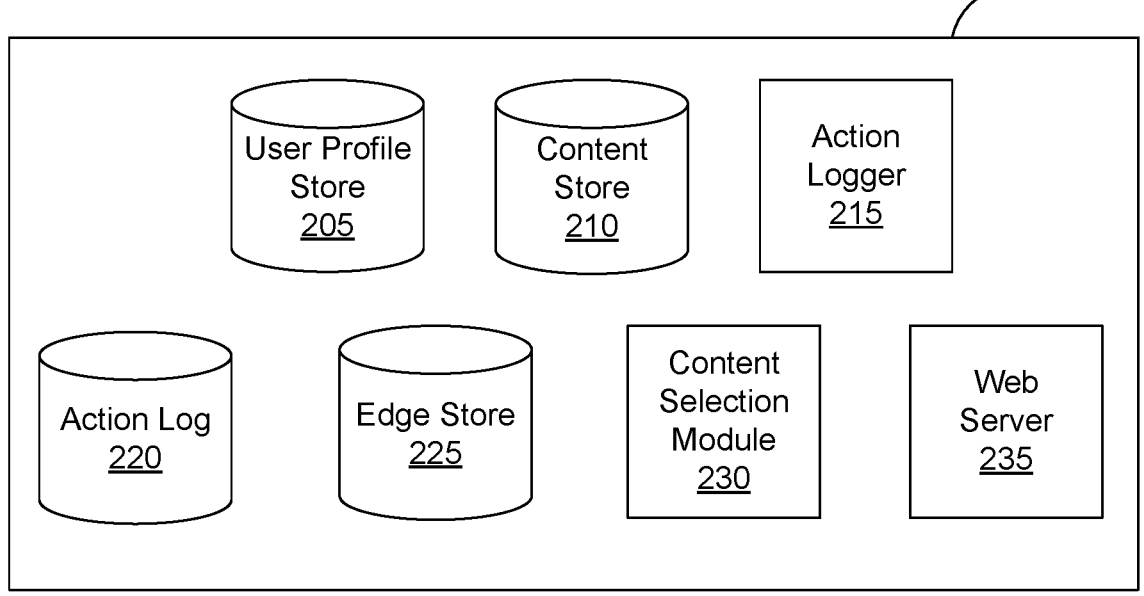
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

In various embodiments, the content store 210 includes video data captured by a client device 110 and metadata associated with the video data by the client device 110. For example, a client device 110 extracts information from the captured video data and stores the metadata in association with the captured video data. The client device 110 may communicate the video data and associated metadata to the online system 140, which stores the video data and associated metadata in the content store 210. In various embodiments, the online system 140 receives information identifying a user of the online system 140 along with the video data and associated metadata and stores the information identifying the user in association with the video data and with the metadata associated with the video data. The online system 140 may retrieve video data and metadata associated with the video data from the content store 210 and provide the video data and associated metadata to client devices 110 associated with other users of the online system 140 in response to receiving a request from the user who provided the video data to the online system 140 to provide the video data to other users.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

Additionally, the content selection module 230 receives video data from an application executing on a client device 110 and provides the video data to one or more viewing client devices 110 each associated with a viewing user. In various embodiments, the online system 140 receives video data captured by the client device 110 and identifiers of one or more viewing users to receive the video data. The content selection module 230 retrieves information from the user profile store 205 identifying a client device 110 associated with each identified viewing user and provides the video data to client devices 110 associated with different identified viewing users. As further described below in conjunction with FIG. 4, the content selection module 230 allows a viewing user to initiate modification of the video data captured by the client device 110 based on a request received from the viewing client device 110. For example, the content selection module 230 receives a request to modify video data captured by the client device 110 and received by the content selection module 230 and modifies the video data or transmits the request to the client device 110 to modify the video data, as further described below in conjunction with FIG. 4.

The content selection module 230 enforces one or more privacy settings of the users of the online system 140 in various embodiments. A privacy setting of a user determines how particular information associated with a user can be shared, and may be stored in the user profile of a user in the user profile store 205. In one embodiment, a privacy setting specifies particular information associated with a user and identifies other entities with whom the specified information may be shared. Examples of entities with which information can be shared may include other users, applications, third party systems 130 or any entity that can potentially access the information. Examples of information that can be shared by a user include user profile information like profile photo, phone numbers associated with the user, user's connections video data including the user, actions taken by the user such as adding a connection, changing user profile information and the like. In various embodiments, the online system 140 maintains privacy settings associated with a user having a default setting preventing other entities from accessing or receiving content associated with the user, and allows the user to modify different privacy settings to allow other entities that are specified by the user to access or to retrieve content corresponding to the modified privacy settings.

The privacy setting specification may be provided at different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. Specification of the set of entities that can access particular information may also be specified at various levels of granularity. Various sets of entities with which information can be shared may include, for example, all users connected to the user, a set of users connected to the user, additional users connected to users connected to the user all applications, all third party systems 130, specific third party systems 130, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The content selection module 230 includes logic to determine if certain information associated with a user can be accessed by other users connected to the user via the online system 140, third-party system 130 and/or other applications and entities. Based on the user's privacy settings, the content selection module 230 determines if another user, a third-party system 130, an application or another entity is allowed to access information associated with the user, including information about actions taken by the user. For example, the content section module 230 uses a user's privacy setting to determine if video data including the user may be presented to another user. This enables a user's privacy setting to specify which other users, or other entities, are allowed to receive data about the user's actions or other data associated with the user.

The web server 235 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Client Device Architecture

Figure 3:
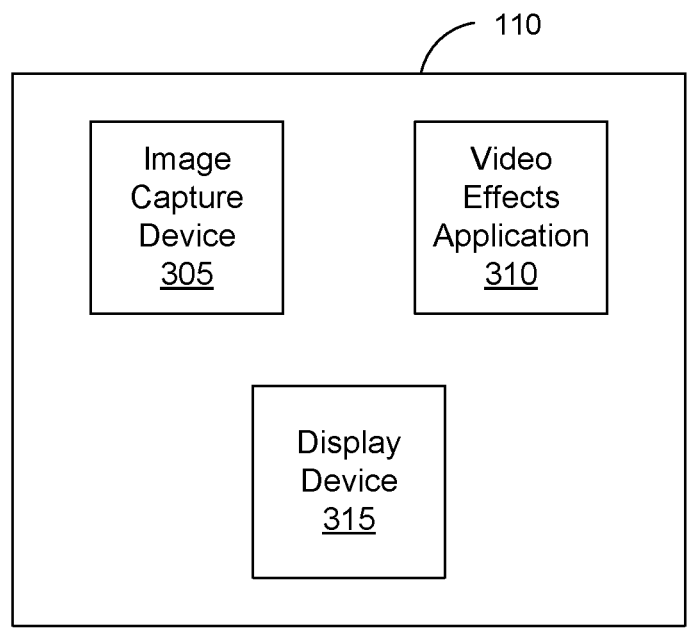
FIG. 3 is a block diagram of a client device, in accordance with an embodiment.

FIG. 3 is a block diagram of one embodiment of an architecture of a client device 110. The client device 110 shown in FIG. 3 includes an image capture device 305, a video application 310, and a display device 315. In other embodiments, the client device 110 may include additional, fewer, or different components for various applications. Further, various components of the client device 110 may provide various combinations of the functionality further described below in some embodiments.

The image capture device 305 is any device capable of capturing image or video data. Example image capture devices 305 include one or more cameras, one or more video cameras, or any other device capable of capturing image data. In some embodiments, the image capture device 305 includes one or more filters. Similarly, the image capture device 305 may include optics for altering light used to generate image or video data in various embodiments. Different client devices 110 may have image capture devices 305 having different characteristics (e.g., resolution of captured image data, shutter control, frame rates, focal lengths, diameter of an entrance pupil capturing light for generating video or image data). While FIG. 3 shows a client device 110 having a single image capture device 305, in various embodiments, client devices 110 may include multiple image capture devices 305.

The video application 310 comprises instructions that, when executed by a processor of the client device 110, extracts information from video data received from the image capture device 305 or from any other suitable source. To extract information from video data, the video application 310 may apply one or more methods to the video data, with various methods extracting different information from the video data. For example, one or more methods applied by the video application 310 detect objects, such as faces, from various frames of the video data. As another example, one or more methods applied by the video application 310 determine optical flow vectors describing movement of objects or other components of the video data based on various frames of the video data. In various embodiments, the video application 310 may extract any suitable information from video data. In other examples, information extracted from video data tracks one or more objects across various frames of the video data (e.g., through application of one or more particle filters to the video data) or identifies changes in one or more objects detected in the video data (e.g., a change in expression of a face detected in the video data). Additionally, information extracted from video data by the video application 310 may be determined based on settings specified by a user of the client device 110, based on information specified by the video application 310, information specified by another application executing on the client device 110, or based on information from any other suitable source. This allows customization of information extracted from video data by the video effects application in various implementations.

Additionally, the video application 310 provides video data captured by the image capture device 305 to the online system 140 or to one or more other client devices 110. In various embodiments, a user of the client device 110 identifies one or more viewing users of the online system 140 via the video application 310, and the video application 310 communicates video data captured by the image capture device 305 and information identifying the one or more viewing users to the online system 140. Based on the information identifying the one or more viewing users, the online system 140 identifies client devices 110 associated with each of the viewing users from the user profile store 205 and communicates the video data to the client devices 110 associates with the one or more viewing users. Similarly, the video application 310 may receive video data from the online system 140 or from another client device 110 and present the received video data to a user.

Additionally, the video application 310 receives information identifying modifications to video data. Information identifying modifications to video data may be received from a user of the client device 110, received from another application, received from an online system 140, received from a third party system 130, or received from another client device 110. Examples of modifications to video data identified to the video application 310 include application of one or more filters to the video data, overlying text on one or more portions of the video data, overlaying images on one or more portions of the video data, altering a playback speed of the video data, modifying audio included in one or more portions of the video data, identifying movement of objects in the video data, modifying shading or coloring of one or more frames of the video data, tracking objects within the video data (e.g., application of particle filters), identifying changes in one or more objects in the video data (e.g., identifying a change) and any other suitable modification. One or more modifications to the video data may identify data obtained by the client device 110 when the video data is captured or is presented that affects how the video data is modified; for example, a modification to the video data identifies one or more inputs received by the client device 110 when the video data is presented (via the client device 110 or via another client device 110 that receives the video data) and instructions for altering image or text data overlaid on the video data based on the received one or more inputs. In other examples, data from an accelerometer of a client device 110, from a position sensor of the client device 110, from a microphone of the client device 110, or from any other suitable component of the client device 110 may be identified and used to determine how the video data is modified when presented by the client device 110. Additionally, information identifying modifications to video data may specify one or more characteristics of the metadata associated with the video data for performing a modification; for example, information describing a modification to the video data may specify a threshold measure of similarity to a particular object so an identified modification is performed if an object identified by the metadata has at least the threshold measure of similarity to the particular object, but the identified modification is not performed if the object identified by the metadata has less than the threshold measure of similarity to the particular object. Different modifications to video data may be identified to the video application 310 in various embodiments, so different implementations of the video application 310 may identify different modifications to video data. As further described below in conjunction with FIG. 4, a modification to the video data captured by the image capture device 305 may be identified by a viewing client device 110, different than the client device 110, to which the video data captured by the image capture device 305 is provided. Hence, interaction with the video data via the viewing client device 110 causes the video application 310 executing on the client device 110 to modify the video data captured by the image capture device 305.

The display device 315 included in the client device 110 presents image data or video data to a user of the client device 110. Examples of the display device 315 include a liquid crystal display (LCD), an organic light emitting diode (OLED) display, an active matrix liquid crystal display (AMLCD), or any other suitable device. Different client devices 110 may have display devices 315 with different characteristics. For example, different client devices 110 have display devices 315 with different display areas, different resolutions, or differences in other characteristics.

Figure 4:
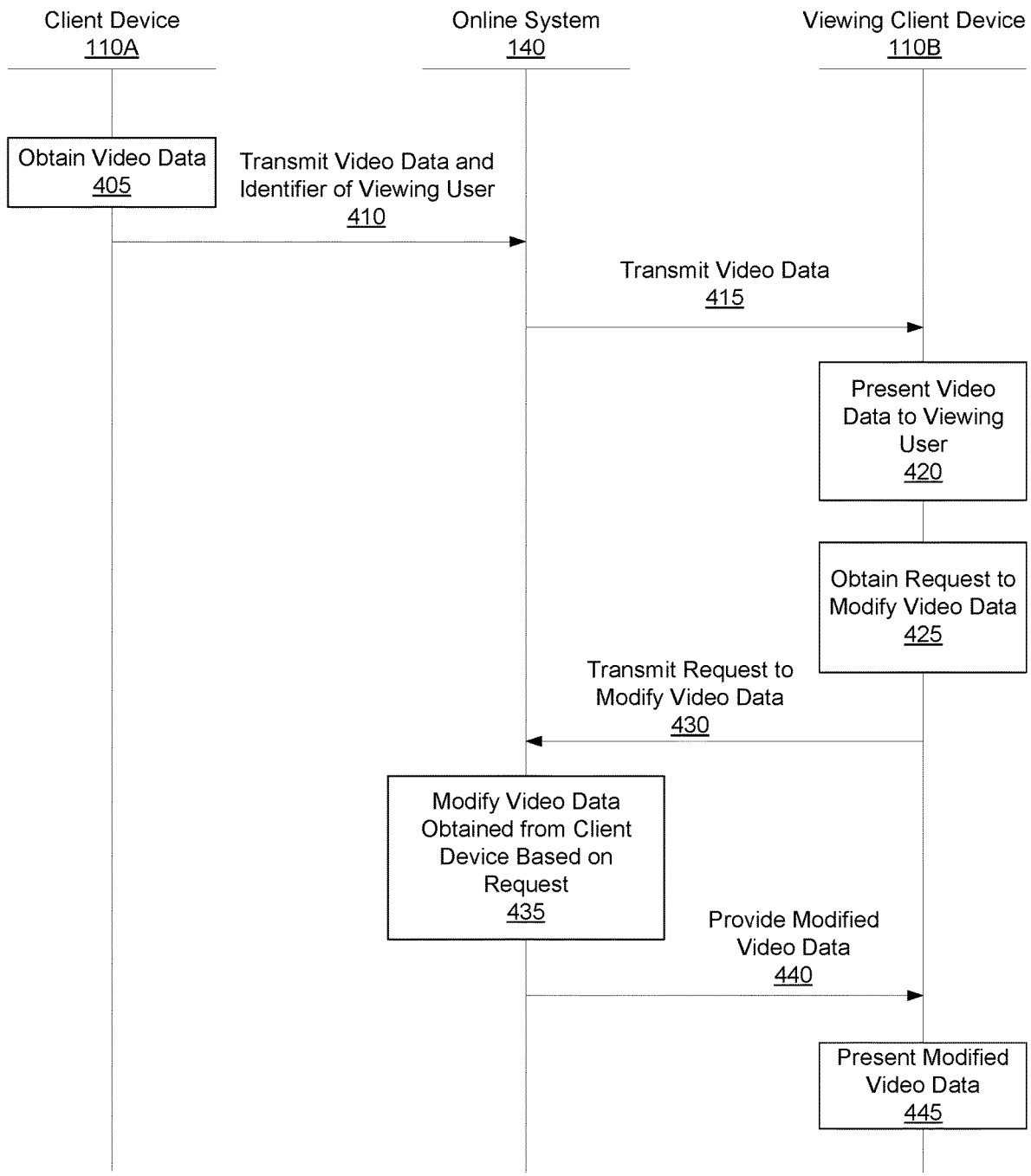
FIG. 4 is an interaction diagram of a method for modifying video data obtained by a client device based on a request received via a different client device, in accordance with an embodiment.

Modifying Video Data Obtained by a Client Device Via Interaction with a Viewing Client Device FIG. 4 is an interaction diagram of one embodiment of a method for providing video data obtained by a client device 110 and modifications to the video data to another client device 110 that performs the modifications and presents the modified video data. In other embodiments, the method may include different and/or additional steps than those shown in FIG. 4. Additionally, steps of the method may be performed in different orders than the order described in conjunction with FIG. 4 in various embodiments.

A client device 110A obtains 405 video data from an image capture device 305 included in the client device 110A. For example, a camera included in the client device 110A captures 405 video data. In various embodiments, the video data captured 405 by the image capture device 305 has any suitable resolution or any other suitable characteristics. In other embodiments, the client device 110A may capture 405 video data from any suitable source. A video application 310 executing on the client device 110A receives the video data from the image capture device 305 and transmits 410 the video data to an online system 140.

In various embodiments, the video application 310 executing on the client device 110A extracts information from the obtained video data. Any suitable information may be extracted from the obtained video data in various embodiments, and the video application 310 may use any suitable method or combination of methods to extract information from the obtained video data. For example, the video application 310 applies one or more processes to the obtained video data to detect objects, such as faces, included in the captured video data; the video application 310 may identify locations within one or more frames of the video data of the detected objects. As another example, the video application 310 applies one or more processes to the obtained video data to determine optical flow vectors describing motion of objects, or any other suitable component, in the obtained video data. In various embodiments, the video application 310 may extract any suitable characteristics of or information about the captured video data.

Additionally, the video application 310 executing on the client device 110 allows a user of the client device 110A to distribute the obtained video data to a viewing client device 110B for presentation to a viewing user of the online system 140. For example, the video application 310 transmits 410 the video data and an identifier of the viewing user to the online system 140. Based on the identifier, the online system 140 determines the viewing client device 110B from information associated with the identifier by the online system 140. The online system 140 transmits 415 the video data to the viewing client device 110B, which presents 420 the video data received from the online system 140, which was obtained 405 by the client device 110A, to the viewing user.

If the video application 310 extracted information from the obtained video data, the video application 310 transmits 410 the obtained video data and the information extracted from the obtained video data to the online system 140 in some embodiments. The online system 140 transmits 415 the obtained video data and the extracted information to the viewing client device 110B if the online system 140 received information extracted from the obtained video data. For example, the client device 110A transmits 410 an identifier of the viewing user, the obtained video data, and information extracted from the obtained video data to the online system 140, which transmits 415 the obtained video data and information extracted from the obtained video data to the viewing client device 110B associated with the viewing user corresponding to the identifier.

As the viewing client device 110B presents 420 the video data obtained 405 by the client device 110A, the viewing client device 110B obtains 425 a request to modify the video data from the viewing user. The obtained request identifies one or more modifications to the obtained video data. For example, the request identifies a filter to apply to the obtained video data along with identifiers of one or more portions (e.g., identifiers of frames, time intervals) of the obtained video data to which the filter is applied. As another example, the request specifies text or image data to overlay on one or more portions of the obtained video data and identifiers of the one or more portions (e.g., identifiers of frames, time intervals) of the obtained video data where the text or image data is overlaid. The request may identify objects detected from the obtained video data over which text or image data is overlaid in some embodiments.

The viewing client device 110B may obtain 425 the request in different ways. In various embodiments, the viewing client device 110B obtains 425 a trigger action corresponding to a modification of the obtained video data from the viewing user. For example, the viewing user performs a gesture via an input device (e.g., a touchscreen) of the viewing client device 110B that a video application 310 executing on the viewing client device 110B associates with the request to modify the obtained video data. As another example, an image capture device 305 of the viewing client device 110B captures a gesture or a facial expression of the viewing user that the video application 310 executing on the viewing client device 110B associates with the request to modify the obtained video data. Hence, the video application 310 executing on the viewing client device 110B associates different trigger actions with different requests to modify the video data, allowing the viewing client device 110B to obtain 425 different requests to modify the obtained video data by identifying different trigger actions by the viewing user.

The viewing client device 110B transmits 430 the request to modify the video data to the online system 140. In some embodiments, the viewing client device 110B determines the request based on an obtained trigger action and transmits 430 the determined request, which describes one or more modifications to the obtained video data, to the online system 140. Alternatively, the viewing client device 110B transmits 430 a description of an obtained trigger action to the online system 140, which determines the request to modify the obtained video data associated with the trigger action by the online system 140. Hence, the online system 140 may determine a modification to the obtained video data based on the received request and stored information associating modifications with different requests or may determine the modification to the obtained video data based on the received request itself.

Based on the request received from the viewing client device 110B, the online system 140 modifies 435 the video data obtained 405 from the client device 110A. In some embodiments, the online system 140 transmits the request or instructions for modifying the obtained video data corresponding to the request to the client device 110A, where the video application 310 executing on the client device 110A modifies 435 the obtained video data by performing the modification corresponding to the request or to the instructions. The online system 140 receives the modified video data from the client device 110A and provides 440 the modified video data to the viewing client device 110B, which presents 445 the modified video data to the viewing user. Alternatively, the online system 140 performs the modification to the video data corresponding to the request received from the viewing client device 110B to the video data received from the client device 110A and provides 440 the modified video data to the viewing client device 110B, which presents 445 the modified video data to the viewing user.

Hence, the viewing user may initiate modification of video data captured by a different user via the client device 110A by performing a trigger action that is obtained or identified by the viewing client device 110B associated with the viewing user. If the online system 140 transmits 415 the video data obtained 405 by the client device 110A to multiple viewing client devices 110B, when the obtained video data is modified 445 in response to a viewing client device 110B obtaining 425 the request to modify the video data, the modified video data is provided 450 to each of the multiple viewing client devices 110B for presentation to different viewing users. This allows users of viewing client devices 110B other than the client device 110A obtaining 405 the video data to modify the video data obtained 405 by the client device 110A, which may encourage users to exchange video data with each other more frequently or for longer durations.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    obtaining, at an online system, video from a capturing client device of a user of the online system, the video captured by an image capture device of the capturing client device;
    transmitting the video from the online system to a viewing client device for presentation to a viewing user;
    receiving, at the online system, a request from the viewing client device to modify the video by overlaying one or more additional objects on one or more portions of the video from the viewing client device, the received request identifying the one or more additional objects to overlay on the one or more portions of the video and identifying one or more objects in the one or more portions of the video over which the one or more additional objects are overlaid, the request obtained by the viewing client device from an interaction by the viewing user with the viewing client device;
    determining one or more modifications to the video obtained from the capturing client device corresponding to the received request from the viewing client device identifying the modifications;
    modifying, by the online system, the video obtained from the client device to include the one or more determined modifications; and
    transmitting the modified video from the online system to one or more additional client devices, the modified video including the one or more additional objects overlaid over the identified one or more objects in the one or more portions of the video.

2. The method of claim 1, wherein receiving the request to modify the video from the viewing client device comprises:
    receiving a description of a trigger action corresponding to the interaction by the viewing user with the viewing client device.

3. The method of claim 2, wherein determining the one or more modifications to the video corresponding to the request received from the viewing client device comprises:
    determining a request associated with the received description of the trigger action; and
    determining a modification associated with the request associated with the received description of the trigger action at the online system.

4. The method of claim 2, wherein determining the one or more modifications to the video corresponding to the request received from the viewing client device comprises:
    transmitting the description of the trigger action corresponding to the interaction by the viewing user with the viewing client device to the client device.

5. The method of claim 2, wherein the trigger action is selected from: a gesture received via an input device of the viewing client device, a gesture captured by an image capture device of the viewing client device, a facial expression of the viewing user captured by the image capture device of the viewing client device, and any combination thereof.

6. A method comprising:
    receiving, at a viewing client device, video from an online system, the video captured by a capturing client device different from the viewing client device;
    presenting the video captured by the client device different from the viewing client device via a display device of the viewing client device;
    receiving an interaction by a viewing user with the viewing client device corresponding to a request to modify the video captured by the capturing client device via the viewing client device, the request identifying one or more additional objects to overlay on one or more portions of the video captured by the capturing client device and identifying one or more objects in the one or more portions of the video over which the one or more additional objects are overlaid;
    transmitting, to the online system, the request from the viewing client device to modify the video in response to receiving the interaction by the viewing user with the viewing client device;
    receiving modified video at the viewing client device, the modified video comprising video captured by the capturing client device and modified according to the request to modify the video by the viewing client device when the video is captured by including the one or more additional objects overlaid over the one or more objects on the one or more portions of the video; and
    presenting the modified video via the display device of the viewing client device.

7. The method of claim 6, wherein receiving the interaction by a viewing user with the viewing client device corresponding to a modification to the video captured by the client device via the viewing client device comprises:
    obtaining an interaction by the viewing user with the viewing client device corresponding to a trigger action.

8. The method of claim 7, wherein the trigger action is selected from a group consisting of: a gesture received via an input device of the viewing client device, a gesture captured by an image capture device of the viewing client device, a facial expression of the viewing user captured by the image capture device of the viewing client device, and any combination thereof.

9. The method of claim 7, wherein the trigger action is associated with the request identifying a modification to the video captured by the client device.

10. The method of claim 9, wherein the modification to the video captured by the client device identifies a filter and a portion of the video captured by the client device to which the filter is applied.

11. The method of claim 9, wherein one or more of the additional objects comprise an image.

12. The method of claim 9, wherein one or more of the additional objects comprise text.

13. A computer program product comprising a non-transitory computer readable storage medium having instructions encoded thereon that, when executed by a processor, cause the processor to:
  obtain, at an online system, video from a capturing client device of a user of the online system, the video captured by an image capture device of the capturing client device;
  transmit the video from the online system to a viewing client device for presentation to a viewing user;
  receive, at the online system, a request from the viewing client device to modify the video by overlaying one or more additional objects on one or more portions of the video from the viewing client device, the received request identifying the one or more additional objects to overlay on the one or more portions of the video and identifying one or more objects in the one or more portions of the video over which the one or more additional objects are overlaid, the request obtained by the viewing client device from an interaction by the viewing user with the viewing client device;
  transmit the received request from the online system to the capturing client device;
  receive, at the online system, modified video from the capturing client device, the modified video including one or more modifications corresponding to the received request from the viewing client device identifying the modifications; and
  transmit the modified video from the online system to one or more additional client devices, the modified video including the one or more additional objects overlaid over the one or more objects on the one or more portions of the video.

14. The computer program product of claim 13, wherein transmit the request from the online system to the client device comprises:
  transmit the request and instructions for modifying the video determined from the received request from the online system to the client device.

* * * * *